(12) United States Patent
Blohm et al.

(10) Patent No.: US 12,297,519 B2
(45) Date of Patent: May 13, 2025

(54) ENERGY EFFICIENT PROCESS FOR CONCENTRATING AND RECOVERING LITHIUM FROM A LITHIUM CONTAINING BRINE

(71) Applicant: Veolia Water Solutions & Technologies Support, Saint-Maurice (FR)

(72) Inventors: Kurt Blohm, Pittsburgh, PA (US); Jérôme Leparc, Poissy (FR); Isabelle Lemaitre, Paris (FR)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 605 days.

(21) Appl. No.: 17/762,446

(22) PCT Filed: Aug. 31, 2020

(86) PCT No.: PCT/US2020/048675
§ 371 (c)(1),
(2) Date: Mar. 22, 2022

(87) PCT Pub. No.: WO2021/061343
PCT Pub. Date: Apr. 1, 2021

(65) Prior Publication Data
US 2022/0364202 A1     Nov. 17, 2022

Related U.S. Application Data

(60) Provisional application No. 62/905,503, filed on Sep. 25, 2019.

(51) Int. Cl.
*C22B 26/12*     (2006.01)
*B01D 61/00*     (2006.01)
(Continued)

(52) U.S. Cl.
CPC .......... *C22B 26/12* (2013.01); *B01D 61/0021* (2022.08); *C02F 1/441* (2013.01);
(Continued)

(58) Field of Classification Search
CPC .. C22B 26/12; C22B 3/22; C22B 3/42; C22B 9/02; B01D 61/0021; C01F 1/441
See application file for complete search history.

(56) References Cited

U.S. PATENT DOCUMENTS

| 2012/0037566 A1 | 2/2012 | Achilli et al. |
| 2017/0349467 A1 | 12/2017 | Blohm et al. |
| 2018/0245180 A1 | 8/2018 | Cheng et al. |

FOREIGN PATENT DOCUMENTS

| CL | 201902546 | 11/2019 |
| CL | 202000581 | 8/2020 |

(Continued)

OTHER PUBLICATIONS

Alanezi, A., et al., "Enhanced Performance Dual Stage Pressure Retarded Osmosis", Energy Procedia, Elsevier, Jan. 31, 2018, pp. 4182-4197, vol. 142, XP085334876.
(Continued)

*Primary Examiner* — James A Fiorito
(74) *Attorney, Agent, or Firm* — COATS & BENNETT, PLLC

(57) ABSTRACT

A system and process for concentrating a lithium stream is disclosed. The lithium stream is directed to a reverse osmosis unit which produces a concentrate containing lithium compounds. The RO concentrate is directed through two pressure retarded osmosis (PRO) modules connected in series. The two PRO modules further concentrate the RO concentrate and at the same time yield a diluted brine that is effective to drive an energy recovery device. The RO concentrate leaving the PRO modules is directed to an osmoti-
(Continued)

cally assisted reverse osmosis (OARO) module which also further concentrates the RO concentrate.

13 Claims, 1 Drawing Sheet

(51) Int. Cl.
  *C02F 1/44* (2023.01)
  *C22B 3/22* (2006.01)
  *C22B 3/42* (2006.01)
  *C22B 9/02* (2006.01)
  *C02F 103/08* (2006.01)

(52) U.S. Cl.
  CPC .................. *C22B 3/22* (2013.01); *C22B 3/42* (2013.01); *C22B 9/02* (2013.01); *C02F 2103/08* (2013.01)

(56) References Cited

FOREIGN PATENT DOCUMENTS

| | | |
|---|---|---|
| CL | 202001491 | 10/2020 |
| WO | 2016064689 A2 | 4/2016 |
| WO | 2017039724 A1 | 3/2017 |
| WO | 2019097261 A1 | 5/2019 |

OTHER PUBLICATIONS

Soltani, R., et al., "Modeling and simulation of the dual stage pressure retarded osmosis systems", Desalination, Mar. 19, 2019, pp. 28-40, vol. 460, XP085643847.

CL Search Report mailed Sep. 6, 2023 in re CL Application No. 202200739 filed Mar. 24, 2022.

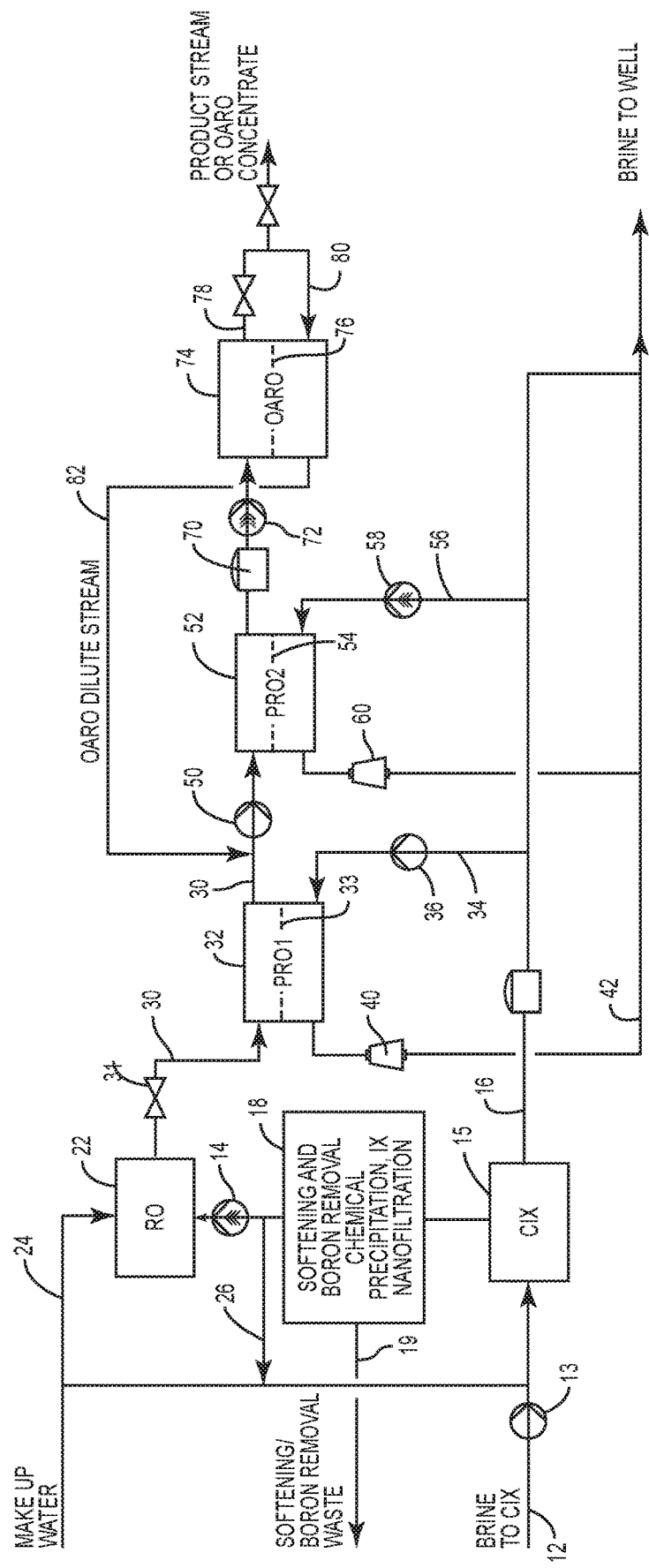

ENERGY EFFICIENT PROCESS FOR CONCENTRATING AND RECOVERING LITHIUM FROM A LITHIUM CONTAINING BRINE

FIELD OF THE INVENTION

The present invention relates to lithium concentration and recovery processes, and more particularly to a highly efficient system and process for concentrating and recovering lithium from a lithium source.

BACKGROUND OF THE INVENTION

Demand for lithium is outpacing the rate lithium is being mined from brines due to the continuing advancements in mobile devices and electric cars. Lithium is an abundant element. There are, however, few commercial resources where lithium is found in concentrations sufficient for producing useful lithium compounds. The primary sources of lithium are geothermal brines and brines from salars, salt lakes and ores.

Typical lithium recovery processes involve extracting lithium from lithium sources such as those referred to above. Once extracted, an eluent is used to desorb the extracted lithium. Softening processes such as chemical precipitation, and nanofiltration, ion exchange are employed to remove hardness, alkalinity and boron. This yields an eluate containing lithium compounds, such as lithium chloride and lithium carbonate. Eventually the lithium compounds are recovered through various types of crystallization processes. However, before recovery can be achieved, most lithium processes concentrate the lithium in the eluate. One approach to concentrating the lithium is by employing a thermal evaporation process. However, concentrating lithium through an evaporation process is highly energy intensive and energy usage is a major component of operating costs (OPEX) and total life cycle cost.

Therefore, there has been and continues to be a need for an energy efficient system and process for concentrating lithium prior to final recovery.

SUMMARY OF THE INVENTION

The present invention entails an energy efficient system and process for concentrating lithium compounds.

In one embodiment, an eluate containing lithium compounds is directed to a reverse osmosis (RO) unit. The RO unit produces a permeate and an RO concentrate containing the lithium compounds and other impurities. Thereafter, the RO concentrate is directed through a low pressure side of two pressure retarded osmosis (PRO) modules (connected in series) having a lithium selective membrane between high and low pressure sides. A brine stream, under pressure, is directed through a high pressure sides of the PRO modules. The brine streams constitute a draw solution. The osmotic pressure of the brine streams force water from the RO concentrate through the lithium selective membrane into the brine streams. This further concentrates the RO concentrate and dilutes the brine streams which are now used to generate power, such as by driving a hydro-turbine or an isobaric recovery device.

After the RO concentrate is further concentrated in the PRO modules, the RO concentrate is pressurized and directed through a high pressure side of an osmotically assisted reverse osmosis (OARO) module also having a lithium selective membrane. Effluent from the OARO module is referred to as a product stream or OARO concentrate since it includes the concentrated lithium compounds. A portion of the product stream is recycled back through a low pressure side of the OARO module. Because the high pressure side of the OARO module is pressurized, water moves from the RO concentrate through the lithium selective membrane into the recycled product stream passing through the low pressure side of the OARO module. This further concentrates the RO concentrate and dilutes the recycle product stream which yields an OARO dilute. The OARO dilute is recycled to a point upstream, which in one embodiment entails recycling the OARO dilute to the last one of the PRO modules.

Other objects and advantages of the present invention will become apparent and obvious from a study of the following description and the accompanying drawings which are merely illustrative of such invention.

BRIEF DESCRIPTION OF THE DRAWINGS

FIG. 1 is a schematic illustration of an energy efficient system and process for concentrating a stream containing lithium.

DESCRIPTION OF EXEMPLARY EMBODIMENTS

As noted above, pure elemental lithium is not found in nature but is instead present as a constituent of salts and other compounds. Lithium salts can be found in geothermal brines, underground brine deposits, mineral ore, as well as sea water. Although the lithium source can come from various areas, one lithium source is geothermal brines. Reference numeral 12 in FIG. 1 points to a geothermal brine. Brine 12 is directed into a low pressure pump 13. By low pressure, it is meant generally that the pressure of the pump is in the range of 0-100 psi. Pump 13 pumps the brine 12 into a continuous ion exchange (CIX) unit 15. Details of the CIX unit 15 are not addressed herein because CIX units are known in the art and appreciated by those skilled in the art and in this case is not per se material to the present invention. The purpose of the CIX unit is to extract lithium compounds from the brine 12 which, in a typical case, is mostly comprised of lithium chloride and sodium chloride. It should be noted that the brine 12 could be subjected to various pre-treatment processes before reaching the CIX unit 15. For example, a pre-treatment process might include precipitating certain metals, such as manganese and zinc, as well as an appropriate filtration process to remove suspended solids. In any event, the CIX unit 15 includes a lithium selective resin that adsorbs lithium from the brine 12. As the brine 12 flows through the CIX unit 15, lithium is adsorbed onto the resin.

To remove the adsorbed lithium, an eluent is directed through the CIX unit 15 and this desorbs the lithium from the resin in the CIX unit 15. The eluent directed into the CIX unit 15 is a combination of recycled permeate 24 from a downstream RO unit, makeup water and a blend stream 26. In one example, the eluent entering the CIX unit 15 contains approximately 200-500 mg/L of lithium chloride. This yields an eluate that leaves the CIX unit 15 and is referred to by the numeral 14 in FIG. 1. Eluate 14 contains mostly lithium chloride and typically includes small amounts of calcium, magnesium, potassium, sulfates, boron and silica. In many cases, the CIX eluate 14 is subjected to an eluate treatment unit or units 18 for softening and boron removal. Various softening processes, including chemical precipitation, ion exchange and nanofiltration, can be employed to remove hardness from the eluate. If there is concern for boron concentration, then the boron can be removed through various conventional processes, such as ion exchange. Eluate treatment unit 18 may produce some sludge or waste. This, as depicted in FIG. 1, can be discharged through line 19.

CIX unit 15 also produces a CIX brine 16 that is depleted in lithium and in typical cases mostly contains sodium, calcium, magnesium, sulfates and chlorides. CIX brine 16 will have a high total dissolved solids concentration, sometimes on the order of approximately 260 g/L. This means that the CIX brine 16 will include a substantial osmotic pressure which, as discussed subsequently, assists in concentrating the lithium compounds during various stages of the process. A total dissolved solids concentration of approximately −240 g/L means that the osmotic pressure of the CIX brine 16 is over 300 bar.

Treated eluate leaving the eluate treatment unit 18 is directed to a high pressure pump 14. By high pressure, it is meant that generally the pump can generate pressures of 500-1200 psi. Pump 14 directs the eluate containing the lithium into a reverse osmosis (RO) unit 22. RO unit 22 produces a permeate 24 that form a part of the eluent directed to the CIX unit 15. As discussed above, the RO permeate 24 can be combined with an optional blend stream 26 to form the eluent which is directed into a designated input in the CIX unit 15.

RO unit 22 produces an RO concentrate 30. RO concentrate 30, which contains concentrated lithium, is directed through a control valve 31 to a pressure retarded osmosis (PRO) module 32. Thus, the RO concentrate becomes the feed to PRO module 32. PRO modules 32 includes a high pressure side and a low pressure side, as well as a lithium selective membrane 33. In this first PRO module stage, the RO concentrate is directed into and through the low pressure side of the PRO module 32. At the same time, a portion of the CIX brine 16 is directed in a counter flow mode through the high pressure side of the PRO module 32. In particular and as shown in FIG. 1, a portion of the CIX brine 16 is referred to as a brine stream (draw solution) 34 and is directed to a low pressure pump 36. Pump 36 pumps the brine stream 34 through the high pressure side of the PRO module 32 and out an outlet of the module. It is appreciated that because of the substantial amount of total dissolved solids in the brine stream 34, the osmotic pressure of the brine stream passing through the PRO module 32 is substantially greater than the osmotic pressure of the RO concentrate passing through the low pressure side of the module. The difference is osmotic pressure between the feed and draw solutions passing through PRO module 32 can vary, depending on the makeup of the feed and the draw solution. In one exemplary embodiment, it is contemplated that the osmotic pressure difference could be on the order of 1500-3000 psi. This difference in osmotic pressure drives water from the low pressure side, through the membrane 33 and into the high pressure side where the water mixes with the brine stream 34 passing there through. This means that the RO concentrate 30 passing through the low pressure side of the PRO module 32 is further concentrated. It also means that the brine steam 34 passing through the high pressure side of the PRO module 32 is diluted. The diluted brine stream 34 exiting the PRO module 32 is used to drive an energy recovery device 40. That is, the pressure exerted by the brine stream (draw solution) 34 can be used to generate electricity or reduce the parasitic energy demand from pumps and other units operating in the process. Brine stream 34, leaving the energy recovery unit 40, joins a brine disposal line 42 that leads to a brine disposal well.

Work achievable by a PRO modules employed in this process is expressed by:

$$W = A(\Delta\pi - \Delta p)/\Delta p, \text{ where}$$

W— Work
A— Specific Permeability of the membrane
Δπ—Difference in osmotic pressure between the feed and draw solution
Δp—Hydraulic pressure on the draw solution side of the membrane.

By differentiating the above equation, the maximum work achievable occurs at a Δp of Δπ/2, such that the maximum work equals $A(\Delta\pi^2)/4$. For the process described here, the osmotic pressure difference, Δπ, between the feed and draw solution is in the range of 1,500-3,000 psi. Therefore, the hydraulic pressure applied, Δp, should be in the range of 750-1,500 psi for maximum efficiency. Operating in this range of values leaves ample driving force (Δπ-Δp) for water permeation across the lithium selective membrane. A higher value of Δπ-Δp is desirable for minimizing the required membrane area and capital cost. However, with the PRO modules operating in a counter flow mode, there is ample driving force to maximize recoverable energy and minimize the number of PRO modules (capital cost).

The PRO modules described here include a one or more hollow fiber membrane elements. The hollow fiber elements may be arranged in various parallel and series configurations similar to the array of pressure vessels and elements in a conventional seawater desalination plant. As noted above, the hollow fiber elements are operated in the counter flow mode with the lithium containing RO concentrate forming the feed and the brine stream circulated through the high pressure side functioning as a draw solution. The draw solution should be on the shell side of the hollow fiber elements because it has a high fouling potential and is operated under high pressure. Another reason for this preferred configuration has to do with pressure loss. The shell side receives the higher flow because it has a much lower pressure drop than the bore side.

As shown in the drawings, there are two stages of PRO modules. Downstream from PRO module 32 is a second PRO module 52. The two PRO modules are connected in series. RO concentrate 30 exiting PRO module 32 is directed to a low pressure pump 50. Low pressure pump 50 pumps the RO concentrate into the low pressure side of PRO module 52. PRO modules 52 also includes a lithium selective membrane 54 that separates the low pressure side from the high pressure side. Similar to the process described with respect to PRO module 32, a portion of the CIX brine 16 is bled off to form a brine stream 56. Brine stream 56 is directed to a low pressure pump 58 which pumps the brine stream into the downstream end of the PRO module 52. Brine stream 56 passes through the high pressure side of PRO module 52. Again, the osmotic pressure of the brine stream 56 is greater than the osmotic pressure of the RO concentrate passing through the low pressure side of the PRO module 52. This again means that the difference in the osmotic pressure will drive water from the low pressure side through the membrane 54 into the high pressure side of the PRO module 52. As already noted, the difference in the osmotic pressure can vary with respect to the feed and draw solution passing through PRO module 52. However, it is contemplated that the difference in osmotic pressure will be approximately 700-800 psi and in some cases even higher. This further concentrates the RO concentrate passing through the low pressure side. At the same time, it dilutes brine stream 56 passing through the high pressure side of the PRO module 52. As seen in FIG. 1, the diluted brine stream 56 exits the upstream end of PRO module 52 and is directed again through an energy recovery device 60 which can be used to drive a hydro-turbine or a pressure exchanger.

RO concentrate leaving PRO module 52 is directed to a break tank 70. From the break tank 70, the RO concentrate is directed to a high pressure pump 72. Pump 72 directs the RO concentrate to an osmotically assisted reverse osmosis (OARO) module 74. OARO module 74 includes a lithium selective membrane 76. Note that the RO concentrate directed to the OARO module 74 is directed through the high pressure side of the OARO module. As discussed below, the RO concentrate passing through the high pressure side of the OARO module 74 is further concentrated. This yields what is referred to as a product stream or OARO concentrate 78. The lithium concentration in the OARO concentrate can vary, depending on many factors. In one example, the lithium concentration in the OARO concentrate is approximately 23 g/L while the chloride concentration is approximately 120 g/L. In this case, however, a portion of the product stream referred to by the numeral 80 is recycled through the low pressure side of the OARO module 74. The osmotic pressure of the recycle stream 80 is generally greater than the osmotic pressure of the RO concentrate passing through the high pressure side of the OARO module 74. The pressure created by pump 72, coupled with the osmotic pressure difference, drives water from the high pressure side of the OARO module 74 to the low pressure side. This effectively further concentrates the RO concentrate passing through the high pressure side of the OARO module 74. At the same time, the recycle stream 80 is diluted and yields an OARO dilute 82 which is recycled to the front of the PRO module 52.

There are other similar methods of purifying and concentrating a lithium stream. For example, one arrangement would be similar to the process described above and shown in FIG. 1 in that it would include a CIX unit and a RO unit downstream from the CIX unit. Downstream of the RO unit would be an OARO module followed by a PRO module. As with the process of FIG. 1, this process would also function to concentrate a lithium stream in the RO unit, OARO module and the PRO module. At the same time, the draw solution employed in the PRO module could be used to generate electricity or power.

The system and process described above and shown in FIG. 1 is a very energy efficient approach to concentrating lithium in a lithium recovery process. PRO modules 32 and 52 utilize the osmotic pressures of draw solutions to concentrate lithium in the feed and at the same time employ the resulting energy to generate electricity or perform other work. Hence, one of the main advantages of this process is low energy consumption that leads to a significant reduction of OPEX. The concentration steps have the potential to operate at neutral or negative (producing) net energy. It is the high chemical potential of the brine that essentially provides this "free" energy.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A method of purifying and concentrating lithium in a lithium containing stream comprising:
   a. directing the lithium containing stream to a reverse osmosis (RO) unit and concentrating the lithium containing stream and producing a permeate and an RO concentrate containing lithium;
   b. further concentrating the RO concentrate by:
      (i) directing the RO concentrate into and through a low pressure side of at least two pressure retarded osmosis (PRO) modules with each containing a lithium selective membrane;
      (ii) pressurizing two brine streams each having a dissolved solids concentration greater than the RO concentrate and directing each of the two brine streams into and through a high pressure side of the PRO modules;
      (iii) utilizing the osmotic strength of the brine streams to force water across the lithium selective membranes of the PRO modules, further concentrating the RO concentrate and diluting the brine streams;
   c. after further concentrating the RO concentrate in the at least two PRO modules:
      i. pressurizing the RO concentrate and directing the RO concentrate into and through a high pressure side of an osmotically assisted reverse osmosis (OARO) module having a lithium selective membrane and producing a product stream containing lithium;
      ii. directing at least a portion of the product stream into and through a low pressure side of the OARO module to produce an OARO dilute;
      iii. concentrating the RO concentrate and diluting the product stream passing through the low pressure side of the OARO module as water associated with the RO concentrate passes from the high pressure side of the OARO module through the lithium selective membrane into the low pressure side of the OARO; and
   e. recycling the OARO dilute to at least one of the PRO modules.

2. The method of claim 1 further including utilizing the diluted brine streams to drive a hydro-turbine or a pressure exchanger.

3. The method of claim 1 wherein the brine streams directed through the high pressure side of the PRO modules originates as an effluent from a continuous ion exchange unit employed to extract lithium from a lithium source.

4. The method of claim 1 further including:
   directing a lithium source stream over lithium selective adsorption media and extracting lithium from the lithium source stream onto the media;
   desorbing the lithium by directing an eluent over the media to yield an eluate containing lithium; and
   wherein the eluate constitutes the lithium containing stream that is directed to the RO unit.

5. The method of claim 1 including utilizing the diluted brine streams to drive an energy recovery device.

6. A method of concentrating a lithium-containing stream comprising:
   directing the lithium-containing stream to a reverse osmosis (RO) unit and concentrating the lithium-containing stream to produce a permeate and an RO concentrate containing lithium;
   further concentrating the RO concentrate by directing the RO concentrate into and through a low pressure side of a pressure retarded osmosis (PRO) module containing a lithium selective membrane;

pressurizing a brine stream having a dissolved solids concentration greater than the dissolved solids concentration of the RO concentrate passing through the low pressure side of the PRO module and directing the brine stream into and through a high pressure side of the PRO module;

utilizing the osmotic strength of the brine stream to force water from the RO concentrate across the lithium selective membrane of the PRO module so as to further concentrate the RO concentrate and in the process diluting the brine stream;

after further concentrating the RO concentrate in the PRO module, pressurizing the RO concentrate and directing the RO concentrate into and through a high pressure side of an osmotically assisted reverse osmosis (OARO) module having a lithium selective membrane and producing a product stream containing lithium;

directing at least a portion of the product stream into and through a low pressure side of the OARO module to produce an OARO dilute; and further concentrating the RO concentrate and diluting the product stream passing through the high pressure side of the OARO module as water associated with the RO concentrate passes from the high pressure side of the OARO module through the lithium selective membrane into the low pressure side of the OARO.

7. The method of claim 6 including recycling at least a portion of the OARO dilute to the PRO module.

8. The method of claim 6 wherein the brine stream directed through the high pressure side of the PRO module originates as an effluent from an ion exchange unit employed to extract lithium from a lithium source.

9. The method of claim 6 further including:
directing a lithium source stream over a lithium selective adsorption media and extracting lithium from the lithium source stream onto the media;
desorbing the lithium from the media by directing an eluent over the media to yield an eluate containing lithium; and
wherein the eluate constitutes the lithium-containing stream that is directed to the RO unit.

10. The method of claim 9 wherein the lithium is extracted from the lithium source stream in a lithium capture unit which produces the brine stream that is directed through the high pressure side of the PRO module.

11. The method of claim 6 wherein there is provided two PRO modules connected in series and the method includes directing the RO concentrate through the low pressure side of each of the PRO modules and wherein there is provided two brine streams with each brine stream being directed through the high pressure side of one of the PRO modules.

12. The method of claim 6 including flowing the RO concentrate and brine in counterflow directions through the PRO module.

13. The method of claim 6 wherein the brine stream passing through the high pressure side of the PRO module is diluted and wherein the diluted brine stream leaving the PRO module is utilized to drive an energy recovery device.

* * * * *